United States Patent Office 3,567,662
Patented Mar. 2, 1971

3,567,662
LOW TEMPERATURE METHOD FOR PREPARING FOAM PRODUCT
Charles R. Schmitt, Oak Ridge, Tenn., assignor to the United States of America as represented by the United States Atomic Energy Commission
No Drawing. Filed Oct. 18, 1967, Ser. No. 677,002
Int. Cl. C08g 22/46
U.S. Cl. 260—2.5
3 Claims

ABSTRACT OF THE DISCLOSURE

Furfuryl alcohol is polymerized at temperatures ranging from −80° C. to +80° C. employing a reaction mixture of furfuryl alcohol and a solvent selected from the group consisting of methanol, ethanol, toluene, and secondary butyl alcohol which is rapidly mixed with a Friedel-Crafts type catalyst selected from the group consisting of chlorosulfonic acid, phosphorous trichloride, thionyl chloride, phosphorous pentoxide, fluosulfonic acid and difluophosphoric acid. Also, a foamed product is prepared by adding a surfactant to the reaction mixture prior to reacting same with the Friedel-Crafts type catalyst.

BACKGROUND OF THE INVENTION

Polymerization of furfuryl alcohol is well known in the prior art. Due to the extremely slow rate of reaction at low temperatures, i.e., room temperatures, the polymerization is performed by use of heat alone or by use of a catalyst plus heat. This is shown, for example, in U.S. Pat. 1,665,235 issued to John P. Trickey et al. on Apr. 10, 1928 for "Furfuralcohol Resins." There, a moldable resinous body is prepared by heating furfuralcohol alone in the presence of a catalyst to a temperature above about 80° C. These processes may be controlled with respect to rapidity of reaction process by manipulation of either heat and/or type or amount of catalyst. The polymerization process may be halted after any predetermined degree of polymerization by dilution with solvents, neutralization of catalyst or removal of heat.

The resulting resinous product is cured by application of heat which carries the resinification reaction to completion, producing an infusible mass.

As far as is known there is no polymerization process which is carried out at low temperatures, such as below ° C. It is desirable for certain space applications, such as rigidization of inflatable structures by in situ polymerization, to provide a low temperature process for polymerization of furfuryl alcohol. Moreover, lightweight polymer products of such resinification processes would be useful as an ablative heat shield material because of its high temperature resistance and high coking yield as compared, for example, to polyurethane foam.

SUMMARY OF THE INVENTION

The object of this invention is achieved by the discovery that furfuryl alcohol could be polymerized at extremely low temperatures by admixing an antifreeze solvent with the furfuryl alcohol prior to contacting the mixture with a Friedel-Crafts type catalyst to initiate polymerization and resin formation. In an alternate embodiment a surfactant is added to the admixture of furfuryl alcohol and antifreeze solvent prior to initiating polymerization to provide a foamed product. Applicant has found that furfuryl alcohol could be polymerized by the method of this invention at any preselected temperature within the range of about −80° to +80° C. to form an infusible product or a lightweight foam product by employing a surfactant additive.

DESCRIPTION OF THE INVENTION

The resinification process is conducted by admixing an antifreeze solvent with a quantity of furfuryl alcohol. Nonlimiting examples of compatible antifreeze solvents are methanol, ethanol, toluene, and secondary butyl alcohol. In particular, methanol has been found to be very effective over the temperature range of −80° C. to +80° C. Mixtures of furfuryl alcohol and antifreeze solvent wherein the furfuryl alcohol comprises approximately 80% by volume is quite satisfactory.

The temperature at which the polymerization will occur can be varied widely depending upon the choice of antifreeze solvent used with the furfuryl alcohol and upon the choice of catalyst used to initiate the polymerization. As noted above, temperatures at which the polymerization will occur range from −80° C. to +80° C.

After mixing the antifreeze solvent with the furfuryl alcohol polymerization is initiated, employing a Friedel-Crafts type catalyst. For this a wide range of catalyst is suitable to effect the polymerization. These include chlorosulfonic acid, phosphorous trichloride, thionyl chloride, phosphorous pentoxide, fluosulfonic acid and difluophosphoric acid. Most of these catalysts have low freezing point characteristics such that no antifreeze solvents are required for their use at temperatures below the melting point of ice. Initiation of polymerization is preferably acomplished by simultaneously and rapidly injecting the furfuryl alcohol solution and the catalyst into a reaction chamber. Resinification occurs substantially instantaneously. Heat generated by the exothermic reaction suffices to cure the resin once the reaction has commenced.

The amount of catalyst used to initiate the polymerization can be varied over wide limits according to the temperature at which the polymerization reaction is to occur and upon the desired properties of the polymer product. Generally, the higher volumetric ratios of catalyst to furfuryl alcohol result in greater exothermicity and more brittleness of the product. A ratio of one part by volume of catalyst to ten parts by volume of furfuryl alcohol-antifreeze (where the furfuryl alcohol comprises approximately 80% of the mixture) is quite suitable over the temperature range from zero to 80° C. A ratio of one part by volume of furfuryl alcohol-antifreeze is particularly effective over the temperature range from −70° C. to zero degrees centigrade.

In an alternate embodiment of the invention a foam polymer product may be prepared. Here it will be appreciated that by "foam product" it is meant a polymer product of considerably lower density than the resinous polymer product hereinbefore described. Applicant has found that by the addition of a suitable surface active agent to the furfuryl alcohol-antifreeze solution a foam polymer product could be prepared. A copolymer of dimethyl polysiloxane and polyoxyalkane ether is an example of a suitable surfactant. This additive is commercially available from the General Electric Company as G. E. SF–1079 silicone surfactant fluid. Other examples of silicone surfactants that are effective foaming agents are Union Carbide L–530 and Y–2908 silicone fluids. Two to 5 grams of surfactant per 100 ml. of furfuryl alcohol-antifreeze solution (80% furfuryl alcohol) produces an acceptable foam product. The volume increase occasioned by the presence of the surfactant varies according to the amount and type of catalyst employed and the temperature of the reaction. Six-to-1 ratios of foam product to volume of original reactants are common and −66° C., and 20-to-1 ratios are common at 80° C., employing chlorosulfonic acid as a catalyst. A phophorous trichloride catalyst can be expected to produce a foam ratio of 21-to-1 at room temperature.

The process can be conducted under vacuum conditions and in unvented vessels as well as in vented reaction vessels. Where a vacuum is employed a pressure of 49 mm. Hg (49 torr) is quite suitable.

It will be apparent that various changes in the composition's process parameters may be resorted to without departing from the spirit and the scope of the invention as hereinafter claimed.

What is claimed is:

1. A method for preparing a foam product comprising the steps of mixing furfuryl alcohol with a solvent selected from the group consisting of methanol, ethanol, toluene, and secondary butyl alcohol, adding a surfactant to said mixture and thereafter rapidly contacting said resulting mixture with a catalyst selected from the group consisting of chlorosulfonic acid, phosphorous trichloride, thionyl chloride, phosphorous pentoxide, fluosulfonic acid and difluophosphoric acid to initiate polymerization and formation of said foam product.

2. The method of claim 1 wherein said polymerization is conducted at a temperature within the range of −80° C. to +80° C.

3. The method of claim 1 wherein said solvent comprises methanol, said catalyst comprises chlorosulfonic acid and said surfactant comprises a copolymer of dimethyl polysiloxane and polyoxyalkene ether.

References Cited

UNITED STATES PATENTS 3,390,107   6/1968   Tashlick et al. _____ 260—2.5

LELAND A. SEBASTIAN, Primary Examiner

U.S. Cl. X.R.

260—88.5